United States Patent [19]
Nightingale

[11] 4,326,682
[45] Apr. 27, 1982

[54] MOUNTING FOR GAS TURBINE POWERPLANT

[75] Inventor: Douglas J. Nightingale, Bellview, Wash.

[73] Assignee: Rolls-Royce Limited, London, England

[21] Appl. No.: 124,735

[22] Filed: Feb. 26, 1980

[30] Foreign Application Priority Data

Mar. 10, 1979 [GB] United Kingdom ............... 08516/79

[51] Int. Cl.³ .......................... F02C 7/20; B64D 27/20
[52] U.S. Cl. .................................. 244/54; 60/226 R; 248/554
[58] Field of Search ............. 244/53 R, 54, 55, 110 B; 60/39.31, 226 R, 226 A; 248/554, 555, 556

[56] References Cited

U.S. PATENT DOCUMENTS

| | | | |
|---|---|---|---|
| 2,539,960 | 1/1951 | Marchant et al. | 244/54 |
| 2,720,370 | 10/1955 | Hasbouak | 248/556 |
| 3,352,114 | 11/1967 | L'Wilde et al. | 244/54 |
| 3,675,418 | 7/1972 | Lenkeit et al. | 244/54 |
| 3,856,239 | 12/1974 | Leibach | 244/53 R |
| 4,044,973 | 8/1977 | Moorehead | 244/54 |
| 4,185,798 | 1/1980 | Dickenson | 244/110 B |

*Primary Examiner*—Galen L. Barefoot
*Attorney, Agent, or Firm*—Stevens, Davis, Miller & Mosher

[57] ABSTRACT

A gas turbine powerplant has an inner casing (4A) containing a gas turbine engine, an outer casing (5) surrounding the inner casing, a fan driven by the engine and driving air through an annular duct defined between the casings. The powerplant is connected to an aircraft fuselage (1) by a front mounting (9,9A,9B,9C) and by a rear mounting (8,10,17,18). The front and rear mountings react lateral forces on the powerplant. The powerplant includes a thrust reverser (11) situated rearwards of the rear mounting and supported by a ring (18) lying in the annulus of the outer casing and forming part of the rear mounting. At each side of the powerplant there is provided a tie (14,15) which connects the inner casing at a joint (6,16A) adjacent the front mounting to the ring of the rear mounting. The ties therefore lie oblique to the main engine axis. The ties react the forward and reverse thrusts of the powerplant.

7 Claims, 4 Drawing Figures

MOUNTING FOR GAS TURBINE POWERPLANT

DESCRIPTION

This invention relates to a mounting for gas turbine powerplant.

In a known mounting for gas turbine powerplant, the powerplant comprises an inner annular casing containing a gas turbine engine, an outer annular casing surrounding the inner casing, a compressor connected to be driven by the engine and adapted to drive air through an annular duct defined between the casings, and thrust reverser means provided at the outer casing for reversing the flow therethrough; and a mounting for said powerplant comprises front and rear structural means arranged respectively at a front and a rear location of the powerplant for supporting the powerplant laterally on a support situated at one side of the powerplant and radially outside the outer casing, tie means situated at said one side of the powerplant and connected obliquely to the axis of the powerplant between the inner casing at said front location and said support at said rear location; the reverser means being supported on said front structural means.

Said structural means react lateral forces acting on the powerplant. Said tie means react the forward thrust of the engine and the reverse thrust occurring when the reverser means are used. The oblique position of the tie means favours the elimination of bending strain on the inner casing.

If it is desired to provide a said outer casing of sufficient axial length to extend rearwardly to or beyond said rear location and to provide a said reverser means rearwardly of the rear location, said tie means are not by themselves sufficient to react the reverse thrust without imposing a bending strain on the inner casing. It is an object of this invention to overcome this difficulty.

According to this invention there is provided a mounting for a gas turbine powerplant which comprises an inner annular casing containing a gas turbine engine, an outer annular casing surrounding the inner casing, a compressor connected to be driven by the engine and adapted to drive air through an annular duct defined between the casings, and thrust reverser means provided at the outer casing for reversing the flow therethrough; the mounting comprising front and rear structural means arranged respectively at a front and a rear location of the powerplant for supporting the powerplant laterally on a support situated at one side of the powerplant and radially outside the outer casing, tie means situated at said one side of the powerplant and connected obliquely to the axis of the powerplant between the inner casing at said front location and said support at said rear location; the improvement comprising second tie means situated at a side of the powerplant opposite to said one side and connected obliquely to the axis of the powerplant between the inner casing at said front location and the outer casing at said rear location, and means supporting said reverser means at the outer casing rearwardly of said rear location.

Said first tie means react the forward thrust of the engine. The component of the reverse thrust exerted by the reverser at said one side of the powerplant is reacted by said support. The component of the reverse thrust at the other side of the powerplant is reacted in succession through the second tie means, the first tie means and said support. The arrangement favours the elimination of bending strain on the inner casing due to the latter thrust component.

An example of the invention will now be described with reference to the accompanying diagrammatic drawings, in which.

Figure 1:
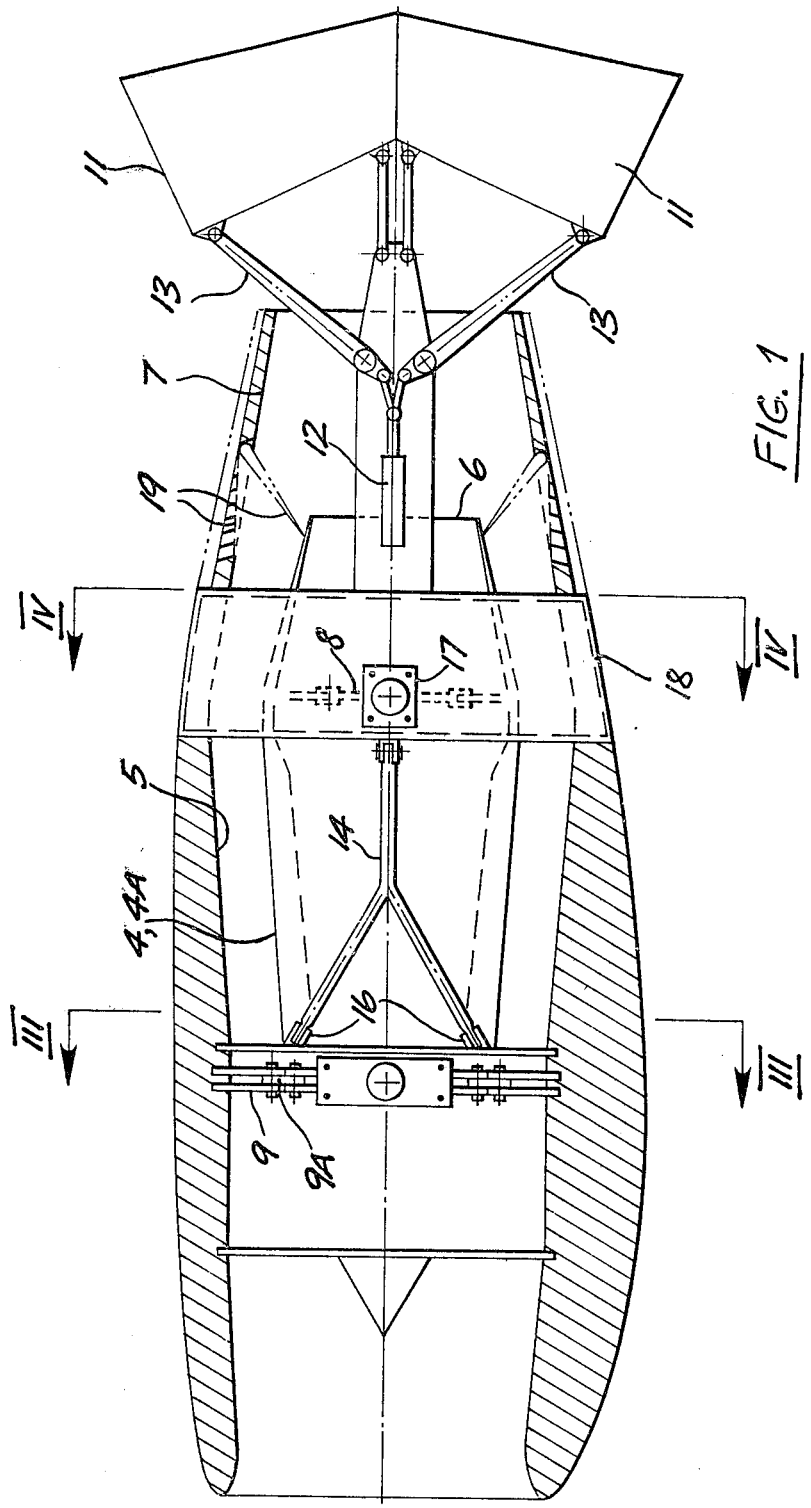
FIG. 1 is a side elevation of a powerplant according to one embodiment of the invention, shown partly in diagrammatic longitudinal section.

The illustrated powerplant is a gas-turbine by-pass powerplant for aircraft propulsion and in the illustrated example is adapted to be mounted at the end of a horizontal supporting boom 1 (FIGS. 3 and 4) at the aft end of an aircraft fuselage. The arrangement and operation of the by-pass powerplant is conventional and does not therefore require detailed description. The powerplant has a low pressure compressor 2 which receives air from an air intake 3 and delivers compressed air to a high pressure compressor of a core gas turbine engine 4 and to a casing 5 of annular cross section coaxially surrounding the core engine 4. The exhaust jet from the core engine 4 is delivered through a nozzle 6, and the outflow from the annular duct between the engine 4 and casing 5 through a nozzle 7 coaxially surrounding the nozzle 6. The forward propulsive force developed by the powerplant is the result of the combined reaction of the jet from the nozzles 6,7.

Figure 3:
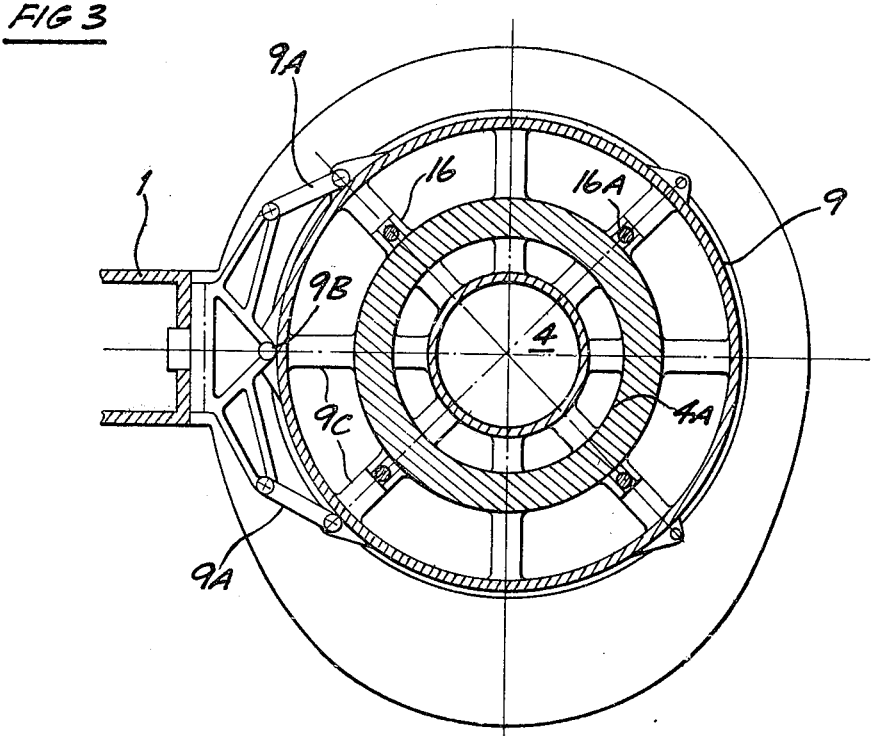
Figure 4:
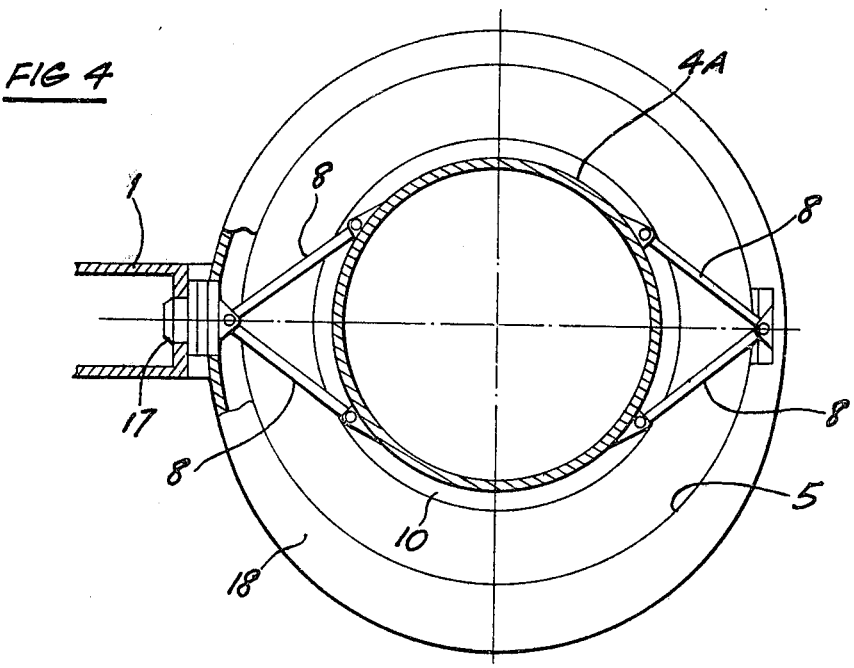

The core engine 4 has a casing 4A supported from boom 1 by lateral front and rear mountings shown in FIGS. 3 and 4 respectively. The front mounting (FIG. 3) includes a mounting ring 9 which surrounds the casing 5, links 9A connecting the ring 9 laterally to the boom 1, and a pivot 9B directly between the ring 9 and the boom, the casings 4A,5 themselves being connected together by vanes 9C. The rear mounting (FIG. 4) includes a ring 10 which surrounds the casing 4A of the core engine 4 and which is connected by links 8 and a joint 17 to the casing 5 and to the supporting boom 1.

Figure 2:
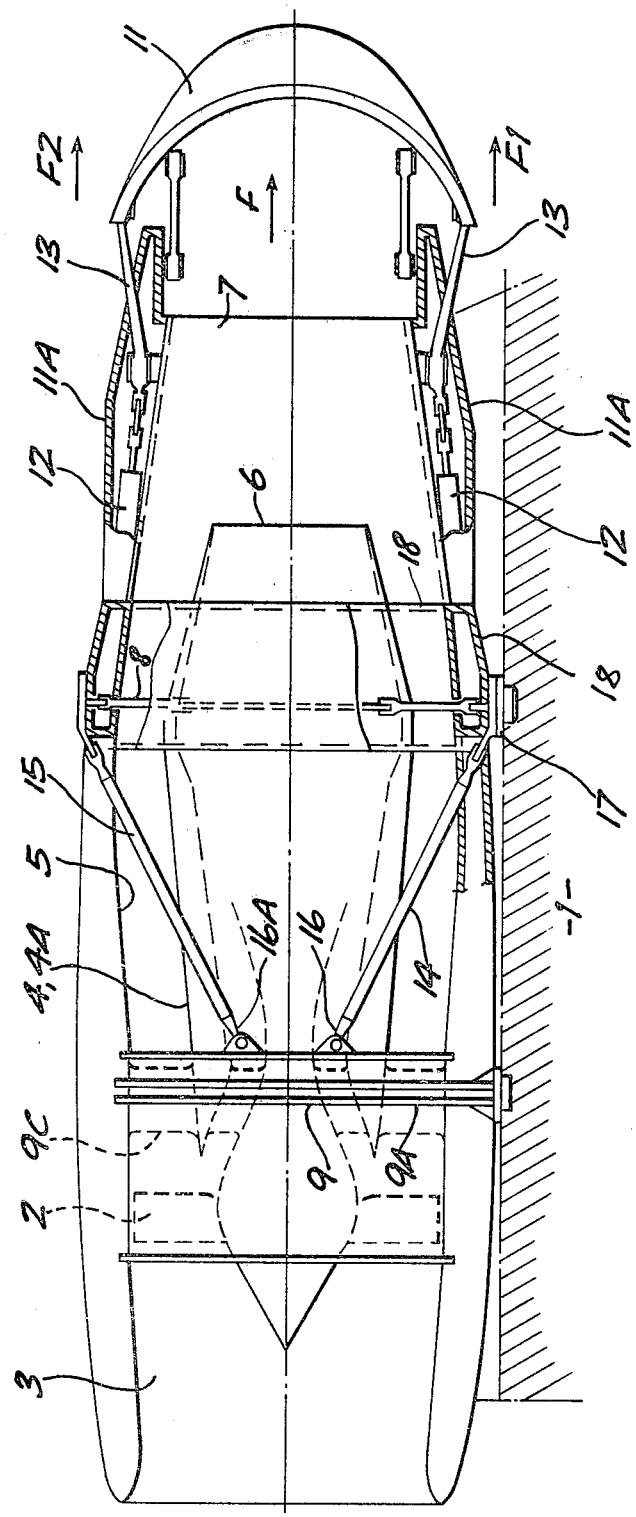
FIG. 2 is a plan view, also partly in diagrammatic longitudinal section, of the powerplant shown in FIG. 1, and FIGS. 3 and 4 are respective diagrammatic cross sections taken on the lines III—III and IV—IV respectively in FIG. 1, including details of the core engine and showing front and rear mountings respectively for attachment of the engine to a lateral support.

A thrust reverser is located at the rear end of the casing 5 and comprises two symmetrical part-cylindrical buckets 11 which in the retracted or stowed position, shown by broken lines in FIGS. 1 and 2, form part of the downstream end of the exterior of the casing 5. The two buckets 11 are pivotally connected to an axially displaceable actuator linkage including hydraulic actuators 12 on opposite lateral sides of the casing 5. The operating linkage for the thrust reversing buckets 11, known per se, includes links 13 which are pivotally connected to the front ends of the two buckets 11, the linkages being such that upon operation of the actuator 12 the buckets 11 are displaced axially rearwardly from their retracted positions and are simultaneously rotated by the links 13 about pivotal connections at their downstream ends to assume deployed positions, shown in broken outline in FIGS. 1 and 2, in which the two buckets form deflecting surfaces in the path of the jets delivered by the core engine 4 and by the casing 5, such as to reverse the flow from the duct between the casings 4A,5, thereby giving rise to a reverse thrust.

At one side of the powerplant being the side adjacent the boom 1, casing 4A is connected to the boom 1 by a tie 14 extending obliquely to the axis A1 of the engine between lugs 16 of the casing 4A and a joint 17 by which the tie 14 is connected to the boom 1, The lugs 16 are situated at a location adjacent the ring 9. The joint 17 is situated at a location adjacent a ring 18 surrounding the casing 5 and connecting the latter to the joint 17. At a position diametrically opposite the tie 14 there is provided a tie 15 connected between lugs 16A and a joint 17A on the ring 18. The forward thrust of the engine is transmitted by tension in the tie 14 to the joint 17, the links 9A going into compression. The oblique position of the tie 14 is such that the line of force through that tie substantially intersects the axis of the engine in the plane of the links 9A thereby to avoid forward thrust causing bending of the engine casing 4A between the front and rear mountings. The pivot 9B has limited freedom of axial motion and provides a normally redundant safety connection.

The thrust reverser buckets 11 are each connected by the links 13 to two arms 11A situated at opposite sides of the casing 5 and secured to the ring 18 in positions rearwardly thereof. The actuators 12 are mounted on the respective arms 11A as shown in FIGS. 1 and 2. When the buckets are deployed, the resulting rearward force F is transmitted as two components F1,F2 through the arms 11A and into the ring 18. At the side of the casing 5 adjacent the boom 1 the component F1 is reacted at the joint 17. At the other side the component F2 is transmitted by tension in the tie 15. The oblique position of the tie 15 results in a compressive force on the ring 18 and tie 14 reacted at the joint 17, and tensile force in the links 9A. The forces due to forward thrust are of course still present and they are partially cancelled by the rearward force, i.e. the compression due to rearward force in the tie 14 at least partly cancels the tension in that tie. It is noted that the links 8,9A are free to articulate in the direction of the axis A1 and do not transmit axial forces.

Analysis of the forces shows that the maximum loads in the respective ties 14,15 are substantially the same. This means that the structure is suitable for mounting the powerplant at either side of an aircraft fuselage. Only the actual fitments for securing the powerplant to the boom concerned need be provided at the side required.

Further, it will be noted that no forces are transmitted by the casing 5 between the rings 9,18. Therefore, as between these rings, the casing 5 may conveniently comprise doors for access to the core engine 4 without giving rise to stress problems.

The rearward force acting on the nozzle 7 is at all times taken by the ring 18 and tie 15 in the same way as the rearward force due to deployment of reverser buckets 11 and therefore participates in the load cancelling effects mentioned.

In a modification, the thrust reverser includes reverser elements 19 embodied in the casing 5 in a manner known per se.

I claim:

1. Mounting for a gas turbine powerplant which comprises an inner annular casing containing a gas turbine engine, an outer annular casing surrounding the inner casing, a compressor connected to be driven by the engine and adapted to drive air through an annular duct defined between the casings, and thrust reverser means provided at the outer casing for reversing the flow therethrough; the mounting comprising front and rear structural means arranged respectively at a front and rear location of the powerplant for supporting the powerplant laterally on a support situated at one side of the powerplant and radially outside the outer casing, tie means situated at said one side of the powerplant and connected obliquely to the axis of the powerplant between the inner casing at said front location and said support at said rear location, second tie means situated at a side of the powerplant opposite to said one side and connected obliquely to the axis of the powerplant between the inner casing at said front location and the outer casing at said rear location, and means supporting said reverser means at the outer casing rearwardly of said rear location.

2. Mounting according to claim 1 wherein said rear structural means comprise a ring lying substantially in the annulus of said outer casing, means connecting said tie means to said ring at diametrically opposite points thereon, and joint means for connecting said ring to said support.

3. Mounting according to claim 1 or claim 2, said outer casing extending rearwardly of the rear structural means, the reverser means including buckets movable between a stowed position on the rear casing and an operative position for reversing the flow at least from said annular duct, and arms extending rearwards from the rear structural means and on which the buckets are mounted, thereby to transmit the rearward forces, acting on the buckets when in the operative position, to said structural means.

4. Mounting according to claim 3 comprising actuators for effecting the movement of the buckets between said positions, said actuators being mounted on said arms.

5. Mounting according to claim 2 comprising an exhaust nozzle defining the rear end of the outer casing, the nozzle being secured to said ring to transmit rearward forces acting on the nozzle to said ring.

6. Mounting according to claims 1 or 2 wherein said reverser means comprise flow reversing elements mounted in said outer casing.

7. A mounting for a gas turbine powerplant which comprises an inner annular casing containing a gas turbine engine, an outer annular casing surrounding the inner casing, a compressor connected to be driven by the engine and adapted to drive air through an annular duct defined between the casings, and a thrust reverser means at the outer casing for reversing the flow therethrough; the mounting comprising front and rear structural means arranged respectively at a front and rear location of the powerplant for supporting the powerplant laterally on a support situated at one side of the powerplant and radially outside the outer casing, tie means at said one side of the powerplant and connected obliquely to the axis of the powerplant between the inner casing at said front location and said support at said rear location, second tie means at a side of the powerplant opposite to said one side and connected obliquely to the axis of the powerplant between the inner casing at said front location and the outer casing at said rear location such that the axes of said first and second tie means at said front location intersect the axis of said gas turbine in substantially the plane of said front structural means, and means supporting said reverser means at the outer casing rearwardly of said rear location.

* * * * *